(12) United States Patent
Boyd et al.

(10) Patent No.: US 7,732,988 B2
(45) Date of Patent: Jun. 8, 2010

(54) FLUID AMPLIFIERS AND VIBRATION DAMPING AND ISOLATION SYSTEMS

(75) Inventors: James Boyd, Glendale, AZ (US); Dale T. Ruebsamen, Glendale, AZ (US); Brett M. McMickell, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 63 days.

(21) Appl. No.: 12/239,166

(22) Filed: Sep. 26, 2008

(65) Prior Publication Data

US 2010/0079033 A1   Apr. 1, 2010

(51) Int. Cl.
*H01L 41/08* (2006.01)
*F16D 65/52* (2006.01)

(52) U.S. Cl. .................. 310/328; 310/311; 188/298
(58) Field of Classification Search .............. 310/311, 310/328; 188/280, 297, 298
See application file for complete search history.

(56) References Cited

U.S. PATENT DOCUMENTS

| | | | |
|---|---|---|---|
| 3,956,970 A | 5/1976 | Kupiek et al. | |
| 5,055,733 A | 10/1991 | Eylman | |
| 5,219,051 A * | 6/1993 | Davis | 188/378 |
| 5,249,783 A * | 10/1993 | Davis | 267/217 |
| 5,332,070 A * | 7/1994 | Davis et al. | 188/298 |
| 6,034,466 A | 3/2000 | Blanding et al. | |
| 6,354,576 B1 | 3/2002 | Jacobs et al. | |
| 6,390,254 B1 * | 5/2002 | Bennett et al. | 188/280 |
| 7,182,188 B2 | 2/2007 | Ruebsamen et al. | |

* cited by examiner

*Primary Examiner*—Thomas M Dougherty
(74) *Attorney, Agent, or Firm*—Ingrassia Fisher & Lorenz, P.C.

(57) ABSTRACT

Fluid amplifiers and vibration damping and isolation systems are provided. A fluid amplifier includes a housing assembly, a piezo-electric element, two amplification stages, and a rod. The piezo-electric element is disposed within the housing assembly and is capable of being energized to lengthen axially to provide an input stroke at an initial magnitude. The first amplification stage is disposed within the housing assembly adjacent to the piezo-electric element and is adapted to amplify the input stroke from the piezo-electric element to a first magnitude. The second amplification stage is disposed in series with the first amplification stage and is adapted to increase the input stroke from the first magnitude to a second magnitude that is greater than the first magnitude to yield an amplified input stroke. The rod extends through the second amplification stage and is coupled thereto to transmit the amplified input stroke having the second magnitude.

20 Claims, 3 Drawing Sheets

FLUID AMPLIFIERS AND VIBRATION DAMPING AND ISOLATION SYSTEMS

TECHNICAL FIELD

The inventive subject matter generally relates to vibration isolation systems, and more particularly relates to fluid amplifiers and vibration damping and isolation systems.

BACKGROUND

To attenuate the vibration and to isolate the payload from structural dynamics of the base, vibration isolators may be included in the structural system. One example of a passive-mass damping and isolation system is a three-parameter vibration isolator, manufactured by Honeywell, Inc. of Morristown, N.J. The D-STRUT® vibration isolator is a three-parameter vibration isolation system that mechanically acts like a first spring ($K_A$) in parallel with a second spring ($K_B$) in series with a damper ($C_A$). The D-STRUT® vibration isolator is disclosed in U.S. Pat. No. 5,332,070 entitled "Three Parameter Viscous Damper and Isolator" to Davis et al. The D-STRUT® vibration isolator includes a hollow shaft and a piston that is configured to slidably move through the shaft. The piston includes a flange that extends radially from a midsection thereof. The flange has a top surface that is coupled to a first sealed bellows and a bottom surface that is coupled to a second sealed bellows. Each of the bellows has a chamber that is filled with fluid. Thus, when the piston moves axially through the shaft, fluid flows from one of the bellows chambers to the other.

An active-passive hybrid damping and isolation system may alternatively be used to damp the structural system. One example of such a system is the Hybrid D-STRUT® vibration isolator, manufactured by Honeywell, Inc. of Morristown, N.J. The Hybrid D-STRUT® vibration isolator includes the passive-mass damping mechanism of the passive D-STRUT® vibration isolator and an active enhancement mechanism. The active enhancement mechanism enhances the force dissipation of the passive damping mechanism and includes an actuator mechanism which has a voice coil actuator system (such as a Lorentz force actuator) that can be tuned to damp a desired vibration. The Hybrid D-STRUT® vibration isolator is disclosed in U.S. Pat. No. 6,003,849 entitled "Hybrid Isolator and Structural Control Actuator Strut" to Davis and Hyde.

Although the above-described vibration isolators are generally useful for damping vibrations in most circumstances, they may be improved. For example, currently-known passive-mass and/or active-passive hybrid damping and isolation systems may not operate as effectively as desired in environments in which the structural system may be subjected to low frequencies (e.g., less than 5 Hz). In particular, vibrations in these frequency ranges may have relatively high amplitudes (e.g., greater than 0.25 cm), and the vibration isolators may be limited to damp vibrations having low amplitudes. Thus, other types of isolators may be employed in addition to the aforementioned types of isolators, which may be undesirable in configurations in which space may be limited.

Accordingly, it is desirable to have a damping and isolation system that is capable of damping vibrations of low frequencies and high amplitudes. In addition, it is desirable for the improved damping and isolation system to be capable of being retrofit into existing systems. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Fluid amplifiers and vibration damping and isolation systems are provided.

In an embodiment, by way of example only, a fluid amplifier includes a housing assembly, a piezo-electric element, a first amplification stage, a second amplification stage, and a rod. The piezo-electric element is disposed within the housing assembly and is capable of being energized to lengthen axially to provide an input stroke at an initial magnitude. The first amplification stage is disposed within the housing assembly adjacent to the piezo-electric element and is adapted to amplify the input stroke from the piezo-electric element to a first magnitude. The second amplification stage is disposed in series with the first amplification stage and is adapted to increase the input stroke from the first magnitude to a second magnitude that is greater than the first magnitude to yield an amplified input stroke. The rod extends through the second amplification stage and is coupled thereto to transmit the amplified input stroke having the second magnitude.

In another embodiment, by way of example only, a fluid amplifier includes a housing assembly, a piezo-electric element disposed within the housing assembly and capable of being energized to axially lengthen, a first amplification stage, a second amplification stage, and a rod. The first amplification stage is disposed within the housing assembly adjacent to the piezo-electric element and is adapted to amplify an input stroke from the piezo-electric element to a first magnitude. The first amplification stage includes a first outer bellows assembly adapted to receive a force from the piezo-electric element and to move axially, when the piezo-electric element is energized and axially lengthens, and a first inner bellows assembly nested within the first outer bellows assembly and adapted to move axially. The second amplification stage is disposed in series with the first amplification stage and is adapted to increase the input stroke from the first magnitude to a second magnitude that is greater than the first magnitude to yield an amplified input stroke. The second amplification stage includes a second outer bellows assembly adapted to move axially in response to axial movement of the first inner bellows assembly, and a second inner bellows assembly nested with the second outer bellows assembly and adapted to move axially and to cause the rod to move axially. The rod extends through the second amplification stage and is coupled thereto transmit the amplified input stroke having the second magnitude.

In still another embodiment, by way of example only, a vibration damping and isolation system includes a fluid amplifier and a vibration isolator. The fluid amplifier includes a housing assembly, a piezo-electric element disposed within the housing assembly and capable of being energized to axially lengthen, a first amplification stage disposed within the housing assembly adjacent to the piezo-electric element and adapted to amplify an input stroke from the piezo-electric element to a first magnitude, a second amplification stage disposed in series with the first amplification stage and adapted to increase the input stroke from the first magnitude to a second magnitude that is greater than the first magnitude to yield and amplified input stroke, and a rod extending through the second amplification stage and coupled thereto transmit the amplified input stroke having the second magnitude. The vibration isolator is coupled to the rod.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
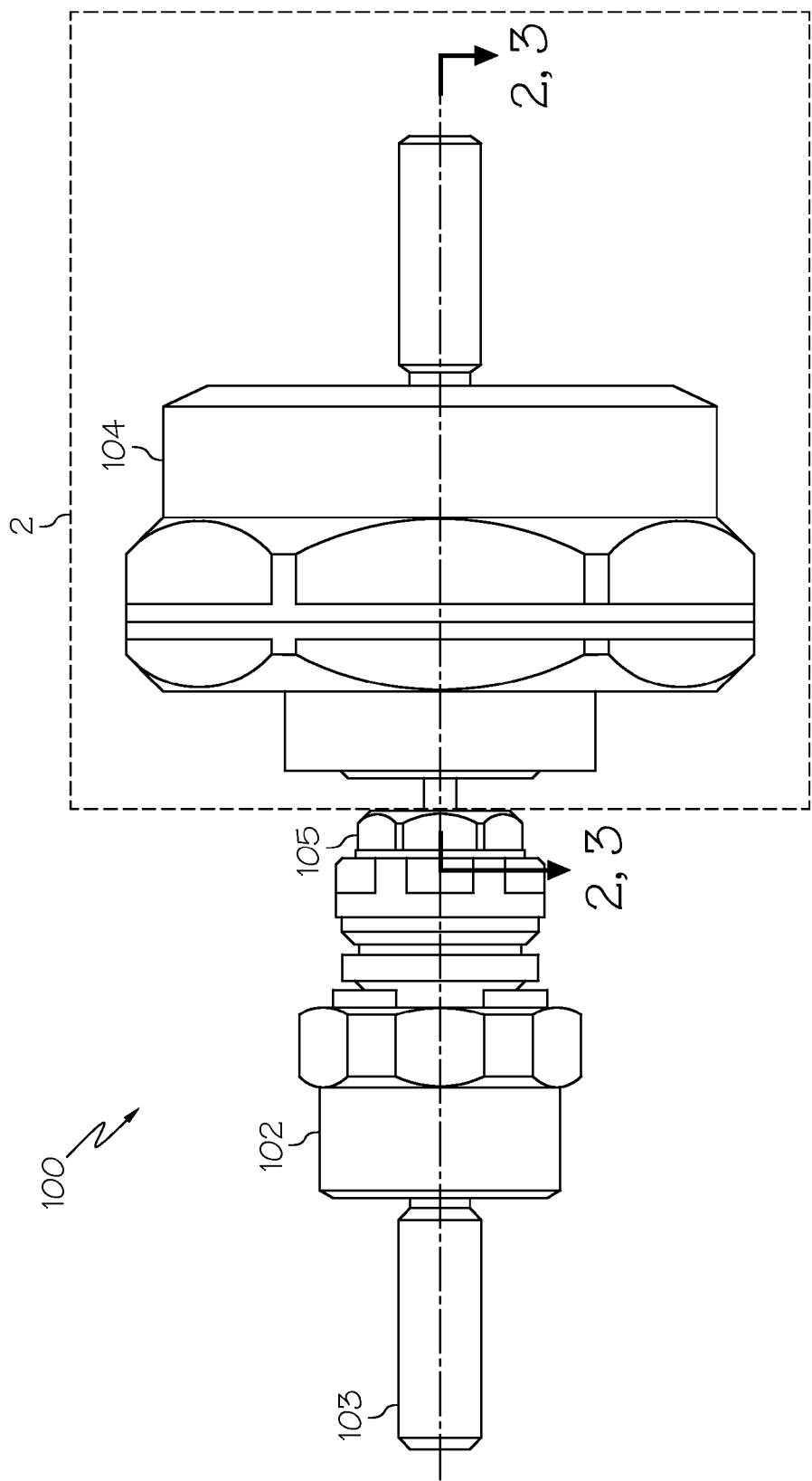
FIG. 1 is a side view of a vibration isolation system, according to an embodiment.

FIG. 1 is a side view of a vibration damping and isolation system 100, according to an embodiment. The vibration damping and isolation system 100 is a hybrid, passive-active isolation system that is configured to be capable of damping vibrations within a relatively wide range of frequencies having a wide range of amplitudes. The system 100 may include a passive mechanism and an active mechanism. In an embodiment, the passive mechanism may be a vibration isolator 102. In accordance with an embodiment, the vibration isolator 102 may be a vibration isolation device adapted to damp vibrations from a structure to be damped, such as a payload (not shown). One example of a vibration isolation device suitable for use as the vibration isolator 102 includes the D-STRUT® vibration isolator, manufactured by Honeywell, Inc. of Morristown, N.J. The features of the D-STRUT® vibration isolator are disclosed in U.S. Pat. No. 5,332,070 entitled "Three Parameter Viscous Damper and Isolator" to Davis et al., which is incorporated herein by reference. The vibration isolator 102 includes a first end 103, which is adapted to couple to the structure to be damped, and a second end 105.

The active mechanism of the system 100 may be a fluid amplifier 104. The fluid amplifier 104 is coupled to the second end 105 of the vibration isolator 102 and is adapted to enhance an ability of the vibration isolator 102 to damp vibrations. In an embodiment, the fluid amplifier 104 may be tuned to allow the vibration isolator 102 to damp vibration frequencies having particular amplitudes. For example, the vibration isolator 102 by itself may damp vibrations within a frequency range of from about 1 Hz to about 500 Hz and the fluid amplifier 104 may allow the vibration isolator 102 to damp vibrations having amplitudes in a range of from about 0.00126 decibels (dB) to about 0.01 dB. In other embodiments, the frequency range and amplitude range may be greater than or less than the aforementioned ranges.

Figure 2:
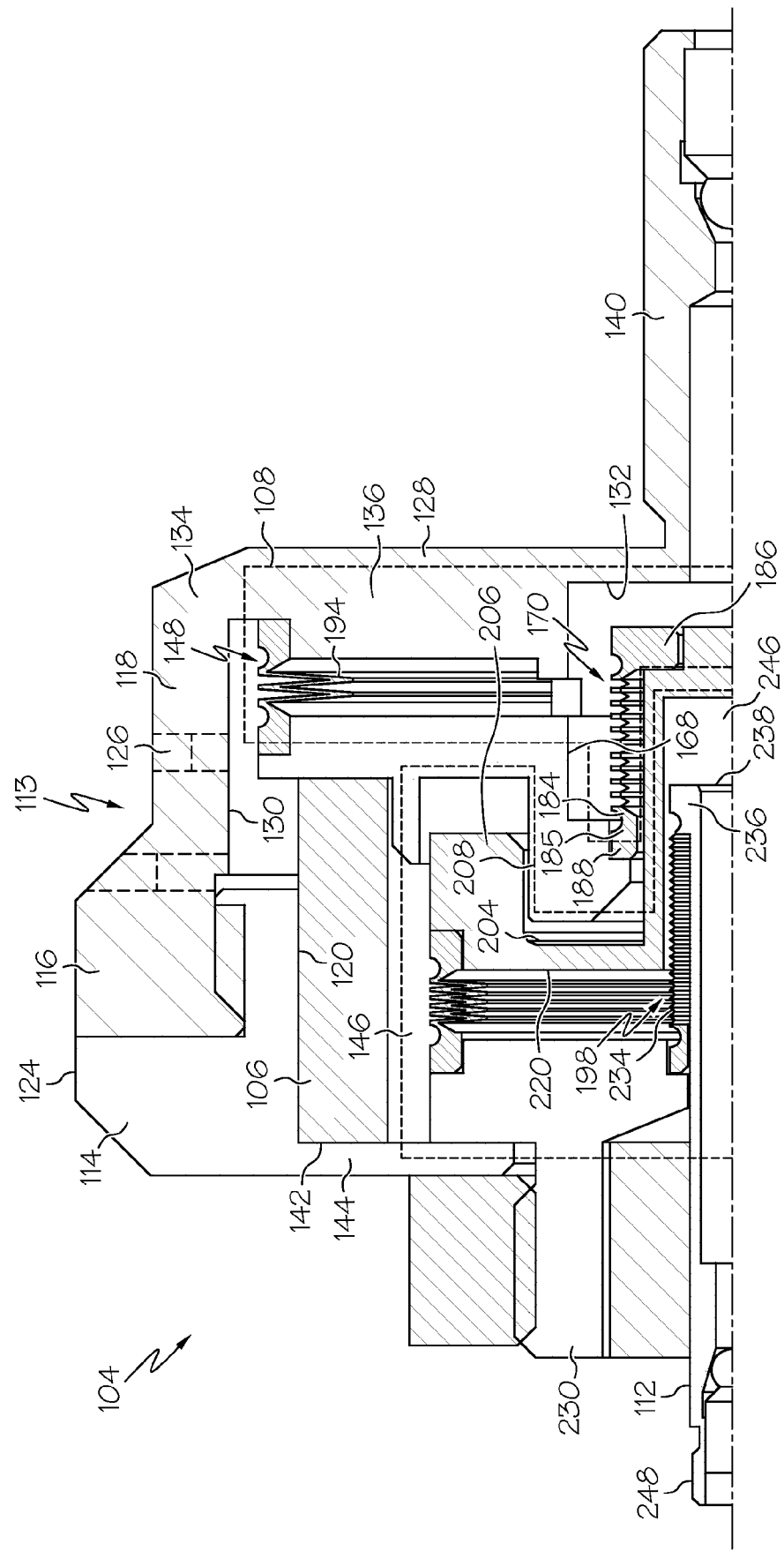
FIG. 2 is a cross-sectional view of a first half of a piezo-electric actuator indicated by dotted rectangle 2 in FIG. 1 taken along line 2,3-2,3, according to an embodiment.
Figure 3:
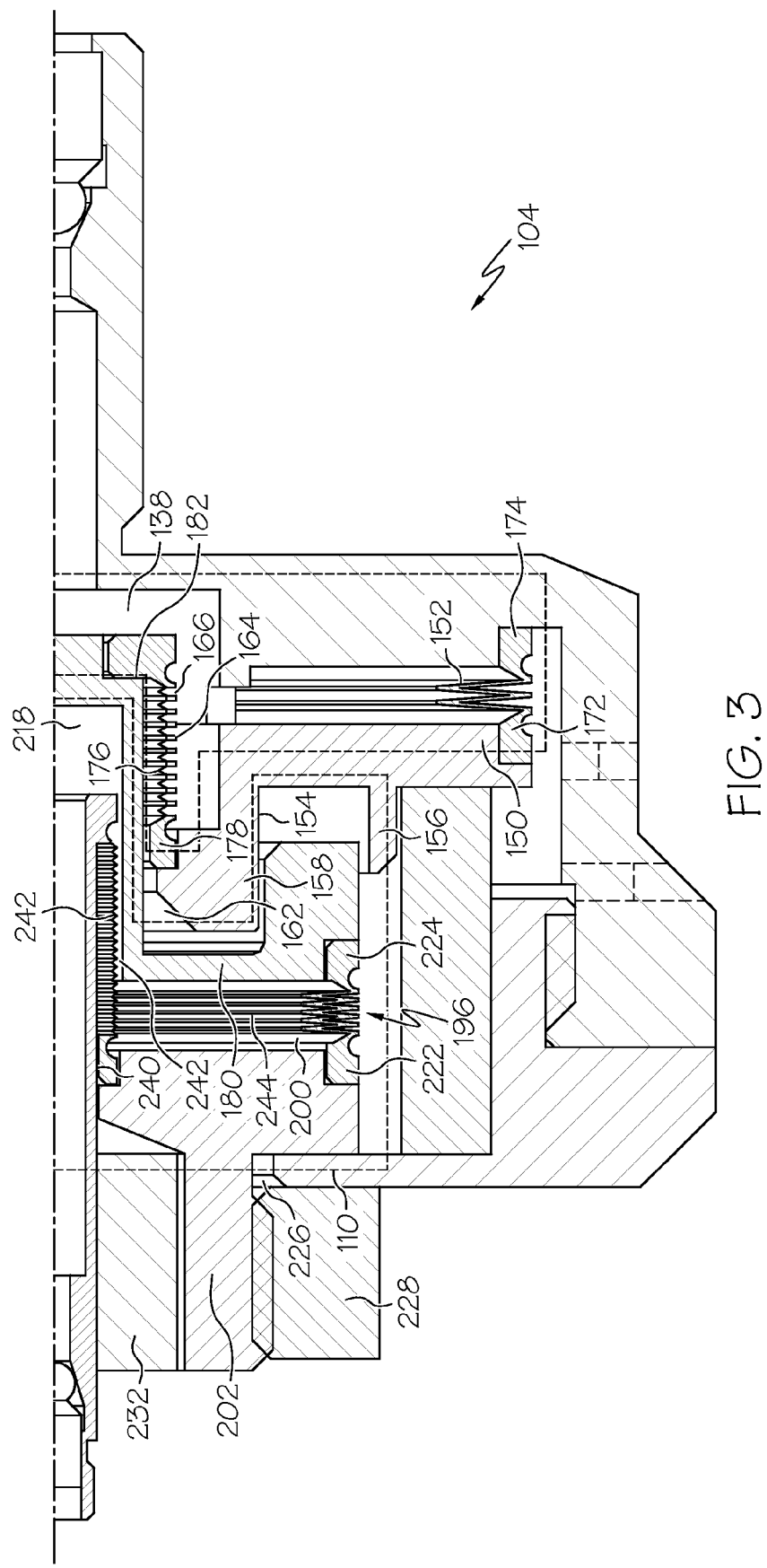
FIG. 3 is a cross-sectional view of a second half of the piezo-electric actuator indicated by dotted rectangle 2 in FIG. 1 taken along line 2,3-2,3, according to an embodiment.

FIGS. 2 and 3 are cross-sectional views of a portion of the damping and isolation system 100 indicated by rectangle 2 in FIG. 1 including the fluid amplifier 104 taken along line 2,3-2,3, according to an embodiment. With side-by-side reference to FIGS. 2 and 3, according to an embodiment, the fluid amplifier 104 includes a piezo-electric element 106, a first amplification stage 108, a second amplification stage 110 disposed in series with the first amplification stage 108, and a rod 112. Each of these components may be accommodated within a housing assembly 113 that includes a housing section 114 that is covered at one end 116 by an end cap 118. The housing section 114 may be ring-shaped and may have an inner surface 120 that partially defines a containment chamber for the fluid amplifier 104 components mentioned above. The housing section 114 also has an outer surface 124 that may have a particular shape, depending on the configurations of surrounding fluid amplifier 104 components. For example, the outer surface 124 may be beveled such that the housing section 114 has a polygonally-shaped radial cross section, in an embodiment. In other embodiments, the outer surface 124 may be smooth so that the radial cross section is generally circular.

In accordance with an embodiment, the fluid amplifier 104 may be relatively small; thus, the housing section 114 may be relatively small. For example, the housing section 114 may have an axial length in a range of from about 2.54 cm to about 12.7 cm, an outer diameter in a range of from about 2.54 cm to about 5.08 cm, and an inner diameter in a range of from about 1.90 cm to about 4.77. In other embodiments, the dimensions of the housing section 114 may be larger or smaller than the aforementioned ranges. The end cap 118 at least partially encloses the housing section 114 and, in an embodiment, includes a ring section 126 and a plate section 128 from which the ring section 126 extends axially. In an embodiment, the ring section 126 has an inner surface 130 that at least partially defines the containment chamber with the housing section 114. To maintain the fluid amplifier components in the housing section 114, the ring section 126 may be configured to snap-fit onto the end 116 of the housing section 114, or alternatively, may include threading so that it may be threaded with corresponding threading on the housing section 114, or may be otherwise coupled to the housing section 114. In one embodiment, the ring section 126 dimensions may be substantially similar to those of the housing section 114. In other embodiments, the ring section 126 may have a larger inner diameter than the housing section 114. Depending on the dimensions of the fluid amplifier components, the ring section 126 may have an axial length in a range of from about 1.27 cm to about 12.7 cm, an outer diameter in a range of from about 2.79 cm to about 7.11 cm, and an inner diameter in a range of from about 2.54 cm to about 5.08 cm. According to other embodiments, the axial length, outer diameter, and inner diameter may be larger or smaller than the ranges previously mentioned.

The plate section 128 has an interior face 132 that also defines a portion of the containment chamber. The interior face 132 may also be adapted to include an outer radial section 134, a mid-section 136, and an inner radial section 138. As alluded to above, the outer radial section 134 is configured such that the ring section 126 extends axially therefrom. In an embodiment, the outer radial section 134 has an outer diameter that is substantially equal (e.g., ±0.5 millimeter (mm)) to that of the ring section 126 so that an outer surface of the ring section 126 is flush with the outer surface of the outer radial section 134. In another embodiment, the outer radial section 134 has an outer diameter that is larger than the outer diameter of the ring section 126 and a circumferential overhang (not shown) may be included around the end cap 118. According to an embodiment, the plate section 128 may be further adapted to include a shaft 140 that extends axially therefrom and is adapted to couple the fluid amplifier 104 to a base (not shown).

The piezo-electric element 106 is disposed in the containment chamber and is configured to be adjustable to resonate with frequencies that are included within a particular frequency range. In this regard, the piezo-electric element 106 may be configured to mechanically deform to a shape or size that is capable of resonating with a desired frequency. In an embodiment, the piezo-electric element 106 may mechanically deform in response to a supply of energy thereto. One example of a mechanical deformation includes lengthening/shortening of an axial length of the piezo-electric element 106. In another example, the mechanical deformation may include a radial expansion/contraction of the piezo-electric element 106. In still another example, both lengthening/shortening and radial expansion/contraction may occur. Additionally, the piezo-electric element 106 may include one or more electrical couplings (not shown), such as wires, contacts, and the like, that are electrically connected to an energy source (not shown) to receive energy therefrom.

In order to incorporate the mechanical deformation properties of the piezo-electric element 106 into the fluid amplifier 104, the piezo-electric element 106 is cylindrically-shaped to allow axial growth or shrinkage of the piezo-electric element 106 occurs along a longitudinal axis. In an embodiment, the piezo-electric element 106 has an end 142 that is positioned against an inwardly extending plate 144 of the housing section 114 and includes a main opening 146 that is suitably sized to accommodate components of the second amplification stage 110. In an embodiment, the piezo-electric element 106 has an axial length that is greater than that of the housing section 114 so that a portion of the element 106 extends into the ring section 126 of the end cap 118. In another embodiment, a portion of the piezo-electric element 106 extends outside of the housing section 114. In any case, in an example, the axial length of the piezo-electric element 106 may be in a range of from about 1.27 cm to about 2.54 cm. However, depending on a desired overall length of the fluid amplifier 104, the axial length of the piezo-electric element 106 may be substantially equal to (e.g., ±0.5 mm) or less than that of the housing section 114. To allow for unconstrained axial movement, the piezo-electric element 106 has an outer diameter that is suitable for accommodation within the housing section 114. For example, the piezo-electric element 106 may have an outer diameter that is less than an inner diameter of the housing section 114. In an embodiment, the outer diameter of the piezo-electric element 106 may be in a range of from about 2.03 cm to about 2.54 cm. In alternative embodiments, the outer diameter may be greater or less than the aforementioned range. The diameter of the main opening 146 may be in a range of from about 0.13 cm to about 0.25 cm, but in other embodiments, the main opening 146 may be larger or smaller.

When the piezo-electric element 106 axially lengthens or shortens, the movement is transmitted to and affects the first amplification stage 108. In particular, the piezo-electric element 106 may supply a force against a first outer bellows assembly 148 of the first amplification stage 108. In one embodiment, the first outer bellows assembly 148 includes an end plate 150, a first bellows 152, and the end cap 118, and surrounds a first inner bellows assembly 170. According to an embodiment, the end plate 150 is located inside of the ring section 126 of the end cap 118. Alternatively, in other embodiments, the end plate 150 may be located radially inwardly from the housing section 114. In any case, the end plate 150 has a first side 154 that is positioned against the piezo-electric element 106. To prevent the piezo-electric element 106 from moving radially, an annular flange 156 having an outer diameter that is less than the outer diameter of the piezo-electric element 106 may extend from the first side 154 of the end plate 150. The annular flange 156 may be ring-shaped, as shown in FIGS. 2 and 3, and may extend into the piezo-electric element 106, in an embodiment. For example, the annular flange 156 may extend through the main opening 146 of the piezo-electric element 106. In other embodiments, the annular flange 156 may extend through the piezo-electric element 106 itself. In still other embodiments, the piezo-electric element 106 may be held in radial position by two or more projections (not shown) that extend from the first side 154 of the end plate 150.

According to another embodiment, the end plate 150 further includes a cup 158 formed radially inwardly relative to the annular flange 156. In an embodiment, the cup 158 extends axially from the first side 154 of the end plate 150 into the main opening 146 of the piezo-electric element 106. The cup 158 is adapted to accommodate a portion of the first inner bellows assembly 170 and a portion of the second amplification stage 110 and hence, includes a passage 162. In an embodiment, the cup 158 has an axial length that is greater than that of the annular flange 156. In an example, the axial length of the cup 158 may be in a range of from about 0.51 cm to about 1.27 cm, and the passage 162 through the cup 158 has a diameter that is in a range of from about 0.64 cm to about 1.14 cm. In other embodiments, the axial length of the cup 158 and the diameter of the passage 162 through the cup 158 may be greater or less than the aforementioned ranges, depending on the sizing of the surrounding components.

Inclusion of the cup 158 in the end plate 150 may result in the formation of a cavity 164 in a radially interior section of a second side 166 of the end plate 150, according to an embodiment. In such case, the cavity 164 may be configured to accommodate components of the first inner bellows assembly 170 and some of the components of the second amplification stage 110. In accordance with an embodiment, the cavity 164 may have a diameter that is in a range of from about 0.89 cm to about 1.19 cm. In other embodiments, the diameter of the cavity 164 may be greater or less than the aforementioned ranges, depending on the sizing of the surrounding components.

The first bellows 152 is coupled to an outer radial section of the second side 166 of the end plate 150 and to the mid-section 136 of the end cap 118. To secure each of the first bellows 152 to the end plate 150 and the end cap 118, attachment rings 172, 174 may be included on either ends of the first bellows 152. In an embodiment, each attachment ring 172, 174 may include a sealing mechanism so that leak-tight seals may be formed between the rings 172, 174, and the end plate 150, and end cap 118.

As alluded to above, the first inner bellows assembly 170 is nested within the first outer bellows assembly 148. The first inner bellows assembly 170 includes a second bellows 176 and a cylindrical projection 178 extending from an attachment plate 180. In an embodiment, the cylindrical projection 178 extends through the passage 162 of the end plate 150. The cylindrical projection 178, and hence, the attachment plate 180 also form part of the second amplification stage 110 as will be discussed in further detail below. In any case, the second bellows 176 is mounted to the cylindrical projection 178, and has a first end 182 that is coupled to an end of the cylindrical projection 178 and a second end 184 coupled to a radial projection 185 that is disposed in a gap formed between an outer surface of the cylindrical projection 178 and a surface defining the end plate passage 162. The outer surface 192 of the second bellows 182, the inner surface 194 of the first bellows 148, and the cavity 164 formed by the cup 158 define the first reservoir 168. The first reservoir 168 may include fluid (e.g., a gas or a liquid) to externally pressurize the second bellows 176. In an embodiment, attachment ring 186, 188 may be included on either ends of the second bellows 176. The attachment ring 186, 188 may each include a sealing mechanism so that leak-tight seals may be formed between the rings 186, 188, the cylindrical projection 178, and end plate 150.

The second amplification stage 110 is disposed in series with the second bellows 176, and hence, the first amplification stage 108, to receive a force therefrom to thereby move the rod 112. In an embodiment, the second amplification stage 110 includes a second outer bellows assembly 196 and a second inner bellows assembly 198. The second outer bellows assembly 196 includes the attachment plate 180 mentioned above, a third bellows 200, and an end plug 202. In accordance with an embodiment, the attachment plate 180 is integrally formed with and moves axially with the cylindrical projection 178 and may include an annular well 204 formed on a first side 206 of the attachment plate 180. The annular well 204 may be configured to accommodate the cup 168 of the end plate 150. In an embodiment, an inner diameter of the annular well 204 may be defined by the outer surface of the cylindrical projection 178 and an outer diameter may be defined by an outer diameter of the cup 168. In any case, particular dimensions of the annular well 204 are preferably selected to accommodate a thickness of the walls 208 of the cup 168.

The attachment plate 180 may also include a cavity 218 formed on a second side 220 thereof. The cavity 218 has a diameter that is suitable for accommodating the second inner bellows assembly 196 and the rod 112. The cavity 218 may also have an axial length that allows at least a portion of the second inner bellows assembly 196 and the rod 112 to extend and move axially therethrough. In an embodiment, the cavity 218 may have a diameter that is in a range of from about 0.64 cm to about 0.71 cm and the axial length of the cavity 218 may be in a range of from about 1.60 cm to about 1.90 cm. In other embodiments, the diameter and axial length of the cavity 218 may be greater or less than the aforementioned ranges, depending on the sizing of the surrounding components.

The third bellows 200 is coupled to the second side 220 of the attachment plate 180 and to the end plug 202. To secure the third bellows 200 to the attachment plate 180 and the end plug 202, attachment rings 222, 224 may be included on either ends of the third bellows 200. In an embodiment, each attachment ring 222, 224 may include a sealing mechanism so that leak-tight seals may be formed between the rings 222, 224, the attachment plate 180, and end plug 202.

The end plug 202 is disposed in an opening 226 formed through a nut 228 that clamps the end plate 202 to the housing section 114. To maintain is position in the housing opening 226, the end plug 202 may have an engagement flange 230 that extends axially therefrom and that is configured to be disposed within the housing opening 226. In an embodiment, the engagement flange 230 includes a cavity 232 in the end plug 202 having dimensions that are suitable for accommodating at least a portion of the rod 108. For example, the cavity 232 may have a diameter that is in a range of from about 0.94 cm to about 1.07 cm and the axial length of the cavity 232 may be in a range of from about 0.64 cm to about 0.76 cm. In other embodiments, the diameter and axial length of the cavity 232 may be greater or less than the aforementioned ranges, depending on the sizing of the rod 112.

The second inner bellows assembly 198 is nested within the second outer bellows assembly 196. According to an embodiment, the second inner bellows assembly 198 includes a fourth bellows 234 mounted to the rod 112. In one embodiment, the fourth bellows 234 has a first end 236 that is coupled to a first end 238 of the rod 112. The fourth bellows 234 also has a second end 240 that is disposed in a gap formed between an outer surface of a mid-section of the rod 112 and a surface defining the end plug opening 226. The second end 240 may include an attachment ring disposed thereon, as shown in FIGS. 2 and 3. The outer surface 242 of the fourth bellows 234, the inner surface 244 of the third bellows 200, and the cavity 218 of the attachment plate 180 define a second reservoir 246, which may include fluid (e.g., a gas or a liquid) to provide external pressurization of the fourth bellows 234. The rod 112 includes a second end 248 that is adapted to mate with the second end 108 of the vibration isolator 102 (FIG. 1) and, as alluded to above, receives vibration therefrom.

Although particular dimensions are provided above for each of the components, they may be specifically selected in order to provide a desired ratio between the radial cross-sectional areas of the first and second bellows 152, 176 and a desired ratio between the radial cross-sectional areas of the third and fourth bellows 200, 234. In particular, the ratios between each set of the bellows 152, 176, 200, 234 determine a particular magnitude of stroke amplification of each fluid amplification stage (e.g., first amplification stage 108 and second amplification stage 110). For example, in an embodiment, the radial cross-sectional area of the first bellows 152 may be much larger than the radial cross-sectional area of the second bellows 176, in an embodiment. According to an embodiment, a ratio between the radial cross-sectional areas of the first bellows 152 and the second bellows 176 of the first amplification stage 108 may be about 16:1. Similarly, the radial cross-sectional area of the third bellows 200 may be much larger than the radial cross-sectional area of the fourth bellows 234, in an embodiment, and a ratio between the radial cross-sectional areas of the third bellows 200 and the fourth bellows 234 of the second amplification stage 110 may be about 25:1. By placing the two stages 108, 110 in series with each other, an input stroke, and hence, an amplitude of a frequency to be damped may be amplified four hundred (400) times. In other embodiments, the desired area ratios and/or amplification may be larger or smaller; hence, the sizing of the bellows and surrounding components may be adjusted accordingly.

In any case, during operation, a particular amplitude of a frequency to be damped may be selected by supplying the piezo-electric element 106 with energy to cause axial lengthening. When the piezo-electric element 106 lengthens, it provides an input stroke having an initial magnitude in the form of an axial force against the end plate 150 and causes the first bellows 152 to contract. As a result, fluid in the first reservoir 168 displaces from the first bellows 152. The fluid displacement causes a force to be supplied on the end of the cylindrical projection 178 causing the second bellows 176 to expand to thereby amplify the initial magnitude of the input stroke to a first, greater magnitude. Because the radial cross-sectional area on which the fluid acts (e.g., the radial cross-sectional area of the second bellows 176) is smaller than the radial cross-sectional area of the first bellows 152, the cylindrical projection 184 is moved an axial length that is proportionate to the force. When the cylindrical projection 184 moves, the attachment plate 180 moves axially as well, which causes the third bellows 200 to contract. The fluid in the second reservoir 246 is then displaced from the third bellows 200 and acts on and supplies a force against the first end 238 of the rod 112 causing the fourth bellows 234 to contract. As a result, the magnitude of the input stroke is increased to a second magnitude that is greater than that of the first magnitude, while the rod 112 moves an axial length that is proportionate to the force.

The improved system may be relatively simple and inexpensive to manufacture and may be retrofit into vehicles, such as aircraft, spacecraft, watercraft or other vehicles in which vibration isolation and damping may be desirable.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A fluid amplifier comprising:
   a housing assembly;
   a piezo-electric element disposed within the housing assembly and capable of being energized to lengthen axially to provide an input stroke at an initial magnitude;
   a first amplification stage disposed within the housing assembly adjacent to the piezo-electric element and adapted to amplify the input stroke from the piezo-electric element to a first magnitude;
   a second amplification stage disposed in series with the first amplification stage and adapted to increase the input stroke from the first magnitude to a second magnitude that is greater than the first magnitude to yield an amplified input stroke; and
   a rod extending through the second amplification stage and coupled thereto to transmit the amplified input stroke having the second magnitude.

2. The fluid amplifier of claim 1, wherein:
   the first amplification stage includes:
      a first outer bellows assembly adapted to receive a force from the piezo-electric element and to move axially, when the piezo-electric element is energized and lengthens axially;
      a first inner bellows assembly nested within the first outer bellows assembly and adapted to move axially; and
   the second amplification stage includes:
      a second outer bellows assembly adapted to move axially in response to axial movement of the first inner bellows assembly; and
      a second inner bellows assembly nested with the second outer bellows assembly and adapted to move axially and to cause the rod to move axially.

3. The fluid amplifier of claim 2, wherein:
   the first outer bellows assembly includes a first bellows having a first radial cross-sectional area;
   the first inner bellows assembly includes a second bellows having a second radial cross-sectional area;
   the second outer bellows assembly includes a third bellows having a third radial cross-sectional area; and
   the second inner bellows assembly includes a fourth bellows having a fourth radial cross-sectional area,
   wherein:
      the first radial cross-sectional area is greater than the second radial cross-sectional area, and
      the third radial cross-sectional area is greater than the fourth radial cross-sectional area.

4. The fluid amplifier of claim 3, wherein a ratio between the first radial cross-sectional and the second radial cross-sectional area is 1:16.

5. The fluid amplifier of claim 3, wherein a ratio between the third radial cross-sectional and the fourth radial cross-sectional area is 1:25.

6. The fluid amplifier of claim 3, wherein:
   a ratio between the first radial cross-sectional area and the second radial cross-sectional area is 1:16;
   a ratio between the third radial cross-sectional area and the fourth radial cross-sectional area is 1:25; and
   the second magnitude of the input stroke is about four-hundred times greater than the initial magnitude of the input stroke.

7. The fluid amplifier of claim 1, wherein:
   the housing assembly includes an end cap coupled to a housing section;
   the first outer bellows assembly includes an end plate and a first bellows, the end plate positioned against to the piezo-electric element and having a passage formed therein, and the first bellows coupled to the end plate and the end cap; and
   the first inner bellows assembly includes a second bellows mounted to a cylindrical projection, the cylindrical projection extending through the opening of the end plate.

8. The fluid amplifier of claim 7, wherein:
   the end plate includes an annular flange and a cup formed radially inwardly relative to the end plate, the passage of the end plate is formed through the cup, and the cup is adapted to accommodate a portion of the first inner bellows assembly.

9. The fluid amplifier of claim 8, wherein:
   the second outer bellows assembly includes an attachment plate, an end plug, and a third bellows coupled between the attachment plate and the end plug, the attachment plate including the cylindrical projection extending axially from the attachment plate.

10. The fluid amplifier of claim 8, wherein:
    the housing section includes an opening; and
    the second outer bellows assembly includes an attachment plate, an end plug, and a third bellows coupled between the attachment plate and the end plug, the attachment plate including a cavity having a diameter for accommodating the second inner bellows assembly and the rod, and the end plug disposed in the opening of the housing section.

11. The fluid amplifier of claim 1, wherein:
    the first amplification stage includes:
       a first outer bellows assembly including a first bellows adapted to receive a force from the piezo-electric element,
       a first inner bellows assembly nested within the first outer bellows assembly and including a cylindrical projection and a second bellows mounted to the cylindrical projection, the cylindrical projection and the second bellows surrounded by the first bellows, the second bellows and the first bellows defining a first reservoir between the first bellows and the second bellows, and
       a first fluid disposed in the first reservoir; and
    the second amplification stage includes:
       a second outer bellows assembly including an attachment plate, a third bellows, and an end plug, the attachment plate including the cylindrical projection extending axially from a first side thereof to define a cavity on a second side of the attachment plate, and the third bellows coupled to the second side of the attachment plate and the end plug, a second inner bellows assembly nested within the second outer bellows assembly and including a fourth bellows coupled to the rod and extending into the cavity of the attachment plate, the fourth bellows and the third bellows defining a second reservoir between the fourth bellow and the third bellows, and a second fluid disposed in the second reservoir; and when the piezo-electric element lengthens axially, the first bellows contracts to cause the first fluid in the first reservoir to supply a force to the second bellows to cause the second bellows to expand, thereby causing the third bellows to contract and causing the second fluid in the second reservoir to supply a second force to the fourth bellows to cause the fourth bellows to expand and move the rod.

12. A fluid amplifier comprising:

a housing assembly;

a piezo-electric element disposed within the housing assembly and capable of being energized to axially lengthen;

a first amplification stage disposed within the housing assembly adjacent to the piezo-electric element and adapted to amplify an input stroke from the piezo-electric element to a first magnitude, the first amplification stage including:

a first outer bellows assembly adapted to receive a force from the piezo-electric element and to move axially, when the piezo-electric element is energized and axially lengthens, and a first inner bellows assembly nested within the first outer bellows assembly and adapted to move axially;

a second amplification stage disposed in series with the first amplification stage and adapted to increase the input stroke from the first magnitude to a second magnitude that is greater than the first magnitude to yield an amplified input stroke, the second amplification stage including:

a second outer bellows assembly adapted to move axially in response to axial movement of the first inner bellows assembly, and a second inner bellows assembly nested with the second outer bellows assembly and adapted to move axially and to cause the rod to move axially; and a rod extending through the second amplification stage and coupled thereto transmit the amplified input stroke having the second magnitude.

13. The fluid amplifier of claim 12, wherein:

the first outer bellows assembly includes a first bellows having a first radial cross-sectional area;

the first inner bellows assembly includes a second bellows having a second radial cross-sectional area;

the second outer bellows assembly includes a third bellows having a third radial cross-sectional area; and the second inner bellows assembly includes a fourth bellows having a fourth radial cross-sectional area, wherein:

the first radial cross-sectional area is greater than the second radial cross-sectional area, and the third radial cross-sectional area is greater than the fourth radial cross-sectional area.

14. The fluid amplifier of claim 12, wherein:

a ratio between the first radial cross-sectional area and the second radial cross-sectional area is 1:16;

a ratio between the third radial cross-sectional area and the fourth radial cross-sectional area is 1:25; and the second magnitude of the input stroke is about four-hundred times greater than an initial magnitude of the input stroke.

15. The fluid amplifier of claim 12, wherein:

the housing assembly includes an end cap coupled to a housing section;

the first outer bellows assembly including an end plate and a first bellows, the end plate positioned against the piezo-electric element and having a passage formed therein, and the first bellows coupled to the end plate and the end cap; and the first inner bellows assembly including a second bellows mounted to a cylindrical projection, the cylindrical projection extending through the opening of the end plate.

16. The fluid amplifier of claim 15, wherein:

the end plate includes an annular flange and a cup formed radially inwardly relative to the annular flange, the passage of the end plate formed through the cup, and the cup adapted to accommodate a portion of the first inner bellows assembly.

17. The fluid amplifier of claim 16, wherein:

the second outer bellows assembly includes an attachment plate, an end plug, and a third bellows coupled between the attachment plate and the end plug, the attachment plate including the cylindrical projection extending axially from the attachment plate.

18. The fluid amplifier of claim 16, wherein:

the housing section includes an opening; and the second outer bellows assembly includes an attachment plate, an end plug, and a third bellows coupled between the attachment plate and the end plug, the attachment plate including a cavity having a diameter for accommodating the second inner bellows assembly and the rod, and the end plug disposed in the opening of the housing section.

19. A vibration damping and isolation system comprising:

a fluid amplifier including:

a housing assembly, a piezo-electric element disposed within the housing assembly and capable of being energized to axially lengthen, a first amplification stage disposed within the housing assembly adjacent to the piezo-electric element and adapted to amplify an input stroke from the piezo-electric element to a first magnitude, a second amplification stage disposed in series with the first amplification stage and adapted to increase the input stroke from the first magnitude to a second magnitude that is greater than the first magnitude to yield and amplified input stroke, and a rod extending through the second amplification stage and coupled thereto transmit the amplified input stroke having the second magnitude, and a vibration isolator coupled to the rod.

20. The system of claim 19, wherein:

a ratio between the first radial cross-sectional area and the second radial cross-sectional area is 1:16;

a ratio between the third radial cross-sectional area and the fourth radial cross-sectional area is 1:25; and the second magnitude of the input stroke is about four-hundred times greater than an initial magnitude of the input stroke.

* * * * *